Sept. 23, 1941.  L. H. SQUIRES  2,256,583
POWER LAWN MOWER
Filed Aug. 3, 1939
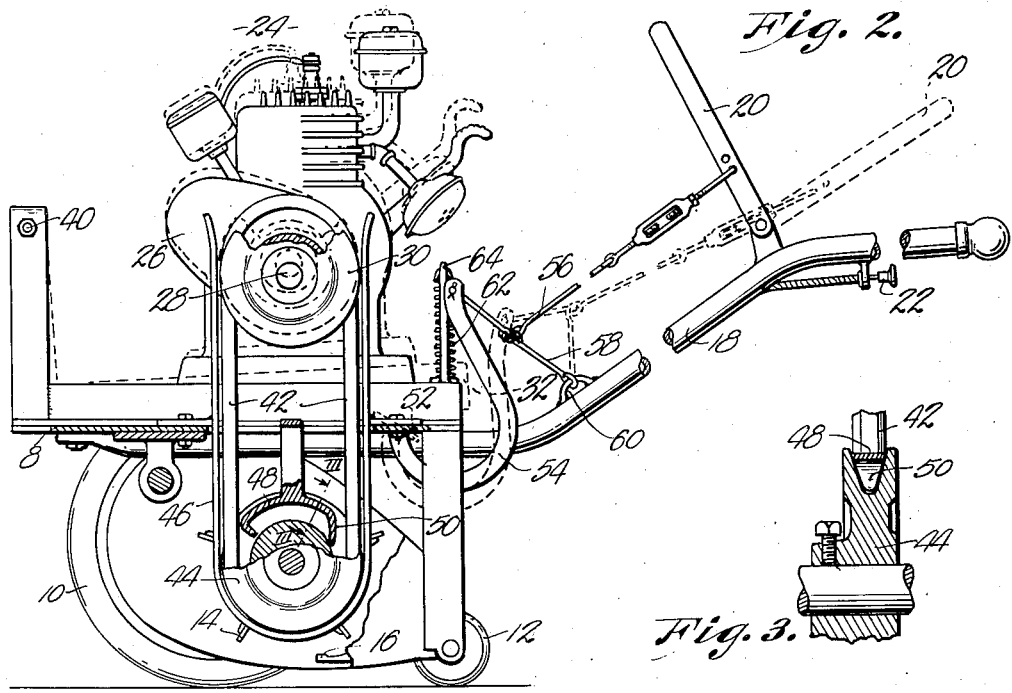
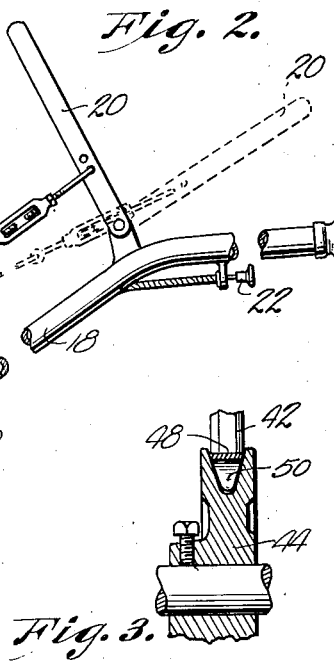
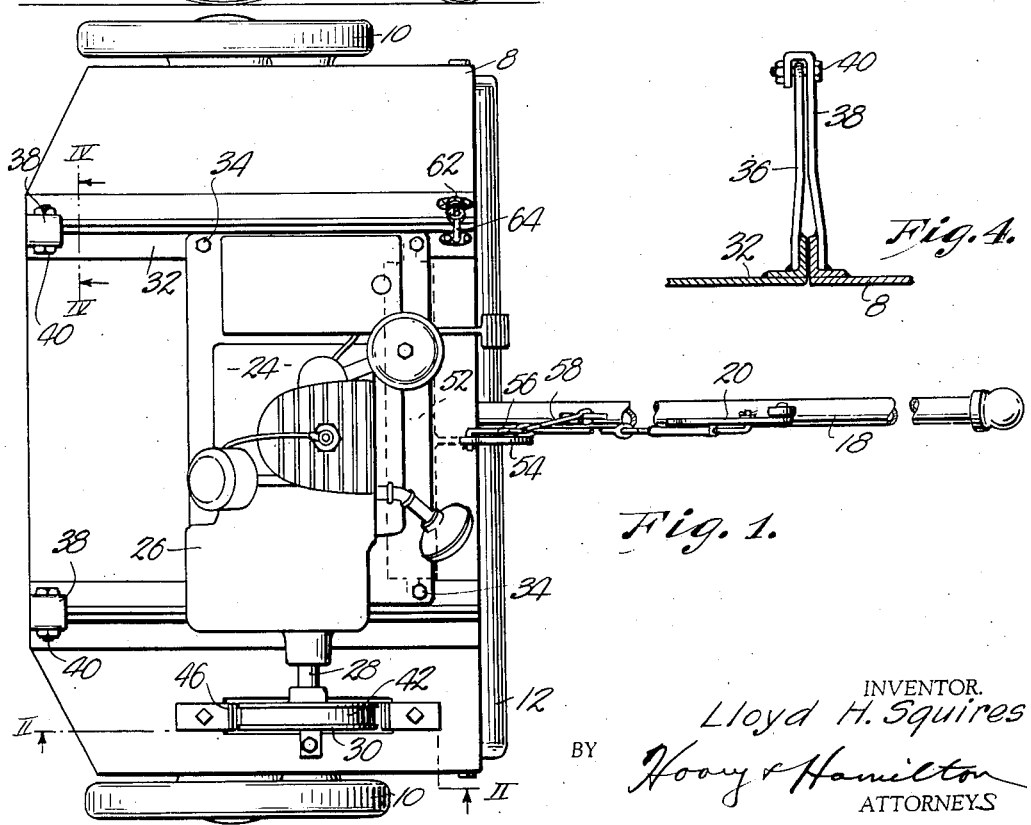
INVENTOR.
Lloyd H. Squires
BY Hoory & Hamilton
ATTORNEYS Patented Sept. 23, 1941

2,256,583

UNITED STATES PATENT OFFICE 2,256,583

POWER LAWN MOWER

Lloyd H. Squires, Olathe, Kans.

Application August 3, 1939, Serial No. 288,137

8 Claims. (Cl. 56—26)

This invention relates to mowing machines of the type employing an engine or the like, for motivating the implement and for driving the cutting wheel thereof while the operator merely guides the machine along the desired path of travel.

One of the important objects of this invention is the provision of a power mower having a swingably mounted engine and speed reducer which are directly connected to the cutting reel of the machine, to the end that no intermediate chains, gears, or other parts, are necessary to rotate the reel at the desired rate of speed as the implement is driven over the supporting surface.

Another important object of the instant invention is to provide a power mower having a direct drive between engine and reel in the nature of an endless belt and a pair of pulleys, which belt is maintained in proper position through the medium of a specially formed U-shaped guard, the legs of which are co-extensive with the stretches of the endless belt between the pulleys.

A yet further object of this invention is to provide a mowing machine of the aforementioned character which has a driven pulley associated with the cutting reel and wherein is arranged a protecting shoe for that portion of the said driven pulley, which is exposed and not engaged by the endless belt which transmits power from an engine to the driven pulley.

This invention has for a further aim the provision of a power mower, the engine of which is mounted in such a manner as to permit swinging movement thereof by the operator for the purpose of moving the same to and from a position where the belt, forming direct connection between the engine and cutting reel, is rendered taut.

The foregoing objects, as well as minor objects which will be apparent to one skilled in the art as the following specification progresses, will be made clear by referring to the accompanying drawing, wherein:

Figure 1 is a top plan view of a power lawn mower, made in accordance with the present invention.

Fig. 2 is a vertical sectional view of the same, taken on line II—II of Fig. 1.

Fig. 3 is an enlarged fragmentary detailed sectional view taken on line III—III of Fig. 2; and, Fig. 4 is a fragmentary detailed sectional view taken on line IV—IV of Fig. 2.

Power mowers of the character embodying my improvements, are well-known in the art, and the advantages of swingably mounting the engine are clearly set forth in U. S. Letters Patent No.2,082,600, issued June 1, 1937 to myself and one other, as joint inventors.

In the machine illustrated herewith, a frame 8 is mounted upon conventional wheels 10, which ride upon the supporting surface with roller 12 as cutting reel 14 cooperates with blade 16 in shearing the blades of grass.

A handle 18 extends upwardly and rearwardly from the machine and carries lever 20 and knob 22 that are operably joined to the engine for the purpose of raising and lowering the same and regulating its speed respectively.

The engine designated in its entirety by the numeral 24, is of the well-known internal combustion type and has as an integral part thereof, a housing 26 wherein is encased speed reducing gears that are operably joined to drive shaft 28 upon which is mounted drive pulley 30.

Engine 24 is mounted upon a swingable carrier 32 through the medium of machine bolts or the like 34, and this carrier has a pair of standards 36 that project upwardly beside the vertical bracket 38 that is integral with frame 8. A bolt 40 swingably joins carrier 32 to the upper free end of bracket 38, as illustrated in Fig. 4.

The axis of rotation of carrier 32 is to one side and slightly above the axis of drive shaft 28. Such arrangement of parts insures that the slight movement imparted to engine 24 will not draw the stretches of endless belt 42 from a vertical position, shown in Fig. 2.

Driven pulley 44 is secured in any well-known manner, directly to the end of cutting reel 14 and belt 42 directly connects this driven pulley 44 with drive pulley 30. The two pulleys 30 and 44 should be the same diameter and their centers should be in substantially the same vertical plane extending transversely across the machine.

The U-shaped guard 46 is mounted directly upon frame 8 and has the bight thereof adjacent to the periphery of the lower half of driven pulley 44. The legs of this guard 46 are rigidly held close to the vertical stretches of endless belt 42 and are co-extensive therewith, as shown in Fig. 2. The belt is relatively stiff and when engine 24 is moved to the position shown in full lines (Fig. 2) from the position illustrated in dotted lines, belt 42 will not be taut enough to transmit power from pulley 30 to driven pulley 44.

Positioning driven pulley 44 directly upon cutting reel 14 places the open part of the groove in a location where particles of grass and other foreign matter, may fall thereinto and hamper the smooth and efficient operation of the machine. Since belt 42 passes around the lower half of pulley 44, slightly less than half of the groove at the top of this pulley is normally open. The arcuate shoe 48 effectively guards the open part of the groove and is held in place by attachment directly to frame 8. When the machine is manufactured, this shoe 48 is adjusted so that it will protect the upper part of the groove and thereafter the operator need pay no attention to this part of the equipment, unless some force accidentally displaces the pulley or shoe 44 or 48 respectively.

One end of shoe 48 is provided with a downwardly and outwardly inclined finger 50. This finger is pointed in the direction opposite to the path of travel of pulley 44 and serves as means for lifting from within the groove, any collected particles of foreign matter. The angle of inclination is such as to cause the particles to move away from the pulley and a clean surface is thereby insured.

Shoe and finger 48 and 50 respectively, should be placed very close to the surface of pulley 44, and while I have shown the shoe as being well within the confines of the groove, it is obvious that the same may be made wider and positioned so that it overlaps a portion of the periphery of the pulley.

Carrier 32 and engine 24 is raised and lowered by manual manipulation of lever 20. A narrow plate 52 overlies carrier 32 along the side opposite to members 36 and a goose neck 54 has one end thereof rigidly secured to plate 52, while the other end is joined to lever 20 through the medium of a series of links 56. An additional link 58 attached to handle 18 as at 60, insures that goose-neck 54 will move plate 52 about its longitudinal edge from the position shown in full lines of Fig. 2, to the position shown in dotted lines thereof, when lever 20 is drawn to the position shown in dotted lines.

The weight of engine 24 is usually sufficient to cause the same and its carrier 32 to move to a position where belt 42 is inoperative, but to insure a quick and positive action, spring 62 is furnished—the upper end being in connection with standard 64 on carrier 32, while the lower end is attached to frame 8.

By directly connecting engine and reel 24 and 14 respectively, it is possible for the operator to remove shoe 48 and place a cross belt between pulleys 30 and 44 to reverse the rotation of the reel, whereby a sharpening action may be established.

Directly connecting the drive and driven parts is also an advantage in that there are no sprockets, chains, exposed gears, or other members, which present dangerous, unsightly, expense and otherwise objectionable features.

Raising and lowering the engine and speed reducer as a unit, is an advantage and a power mower made to embody the concepts of this invention, with respect to direct drive, permits the production of an implement at a relatively low cost without sacrificing efficiency, strength and durability.

Power mowers having physical characteristics other than those shown and described, may be made to embody my invention without departing from the scope of the appended claims.

Having thus described the invention, what is claimed as new and desired to be secured by Letters Patent is:

1. In a power mower of the character described having a frame, a handle for the operator, supporting wheels, and a cutting reel operably connected to the wheels, the combination of a driven pulley on the cutting reel; an engine provided with a drive pulley; an endless belt passing over the driven pulley and drive pulley to establish a direct drive between said engine and the cutting reel; an engine carrier swingably mounted on the frame; and means extending along the handle to within reach of the operator for moving the carrier and engine to and from a normal position where the belt is taut enough to drive the cutting reel, the belt being loose when the engine is not in said normal position, to cause the engine to run without driving the cutting reel.

2. In a power mower of the character described having a frame, a handle for the operator, supporting wheels, and a cutting reel operably connected to the wheels, the combination of a driven pulley on the cutting reel; an engine provided with a drive pulley; an endless belt passing over the driven pulley and drive pulley to establish a direct drive between said engine and the cutting reel; an engine carrier movably mounted on the frame; and means extending along the handle to within reach of the operator for moving the carrier and engine to and from a normal position where the belt is taut enough to drive the cutting reel, said driven pulley and the drive pulley being the same diameter and located one above the other whereby the stretches of the endless belt therebetween are in a vertical position, said belt having a U-shaped guard co-extensive with the stretches thereof between the pulleys and the portion thereof extending around the said driven pulley.

3. In a power mower of the character described having a frame, a handle for the operator, supporting wheels, and a cutting reel operably connected to the wheels, the combination of a driven pulley on the cutting reel; an engine provided with a drive pulley; an endless belt passing over the driven pulley and drive pulley to establish a direct drive between said engine and the cutting reel; an engine carrier swingably mounted on the frame; and means extending along the handle to within reach of the operator for swinging the carrier and engine to and from a normal position where the belt is taut enough to drive the cutting reel, said driven pulley and the drive pulley being the same diameter and located one above the other whereby the stretches of the endless belt therebetween are in a vertical position, said belt having a U-shaped guard co-extensive with the stretches thereof between the pulleys and the portion thereof extending around the said driven pulley, said frame and said engine carrier having a bracket extending therefrom in spaced relation to the drive pulley to a point thereabove where the same are provided with a pivotal connection whereby the axis of rotation of said engine carrier is disposed to one side and above the axis of the drive pulley to maintain the stretches of said endless belt in substantially vertical position as the engine is moved to and from the said normal position.

4. In a power mower of the character described having a frame, a handle for the operator, supporting wheels, and a cutting reel operably connected to the wheels, the combination of a driven pulley on the cutting reel; an engine having a speed reducer forming a part thereof and provided with a drive pulley; an endless belt passing over the driven pulley and drive pulley to establish a direct drive between said engine and speed reducer and the cutting reel; a carrier for the engine and speed reducer movably mounted on the frame; and means extending along the handle to within reach of the operator for moving the carrier, engine and speed reducer to and from a normal position where the belt is taut enough to drive the cutting reel, the belt being loose when the engine is not in said normal position, to cause the engine to run without driving the cutting reel.

5. In a power mower of the character described having a frame, a handle for the operator, supporting wheels, and a cutting reel operably connected to the wheels, the combination of a driven pulley on the cutting reel; an engine provided with a drive pulley; an endless belt passing over the driven pulley and drive pulley to establish a direct drive between said engine and the cutting reel; an engine carrier movably mounted on the frame; and means extending along the handle to within reach of the operator for moving the carrier and engine to and from a normal position where the belt is taut enough to drive the cutting reel, said driven pulley having a shoe in that portion of the groove of the pulley not occupied by the belt to prevent entrance of foreign matter into the pulley groove.

6. In a power mower of the character described having a frame, supporting wheels, and a cutting reel operably connected to the wheels, the combination of a driven pulley on the cutting reel; an engine provided with a drive pulley; an endless belt passing over the driven pulley and drive pulley to establish a direct drive between said engine and the cutting reel; an engine carrier movably mounted on the frame; and means for moving the carrier and engine to and from a normal position where the belt is taut enough to drive the cutting reel, said driven pulley having a shoe in that portion of the groove of the pulley not occupied by the belt to prevent entrance of foreign matter into the pulley groove, said shoe having an inclined finger on one end thereof extending into the groove of the pulley and adapted to lift foreign matter from the groove as the pulley is rotating.

7. In a power mower of the character described, a grooved pulley; a belt passing thereover; and a shoe covering the portion of the pulley groove not occupied by the belt to close the same and prevent the entrance of foreign matter into the groove.

8. In a power mower of the character described, a grooved pulley; a belt passing thereover; and a shoe covering the portion of the pulley groove not occupied by the belt and adapted to prevent the entrance of foreign matter into the groove, said shoe having a downwardly and outwardly inclined finger integral therewith at one end thereof extending into the groove of the pulley and adapted to lift foreign matter from the groove as the pulley is rotated.

LLOYD H. SQUIRES.